Sept. 29, 1925.
F. L. MAIN ET AL
DISK WHEEL
Filed June 4, 1923
1,555,137
2 Sheets-Sheet 1
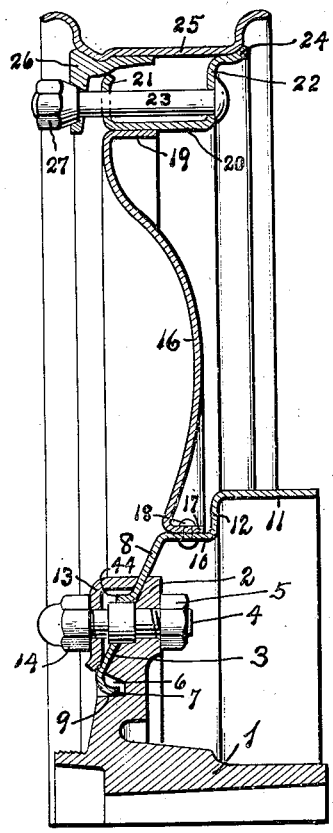
Fig. 1.
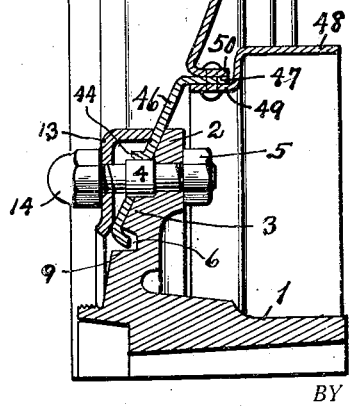
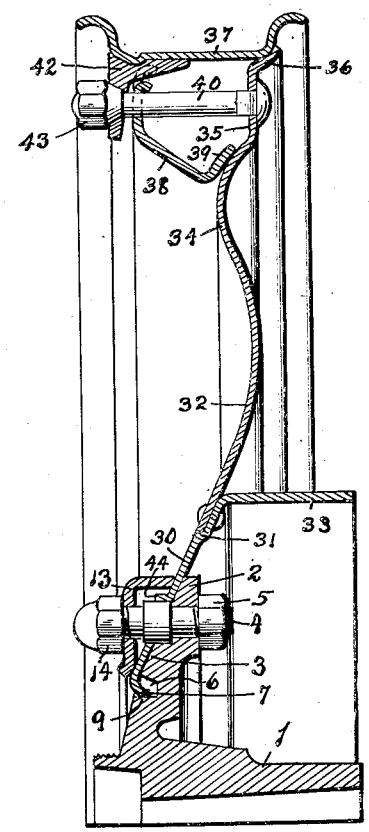
Fig. 2.
Fig. 3.
Inventors
Emil R. Jacobi &
Frank L. Main
BY Edward N. Pagelsen
ATTORNEY.

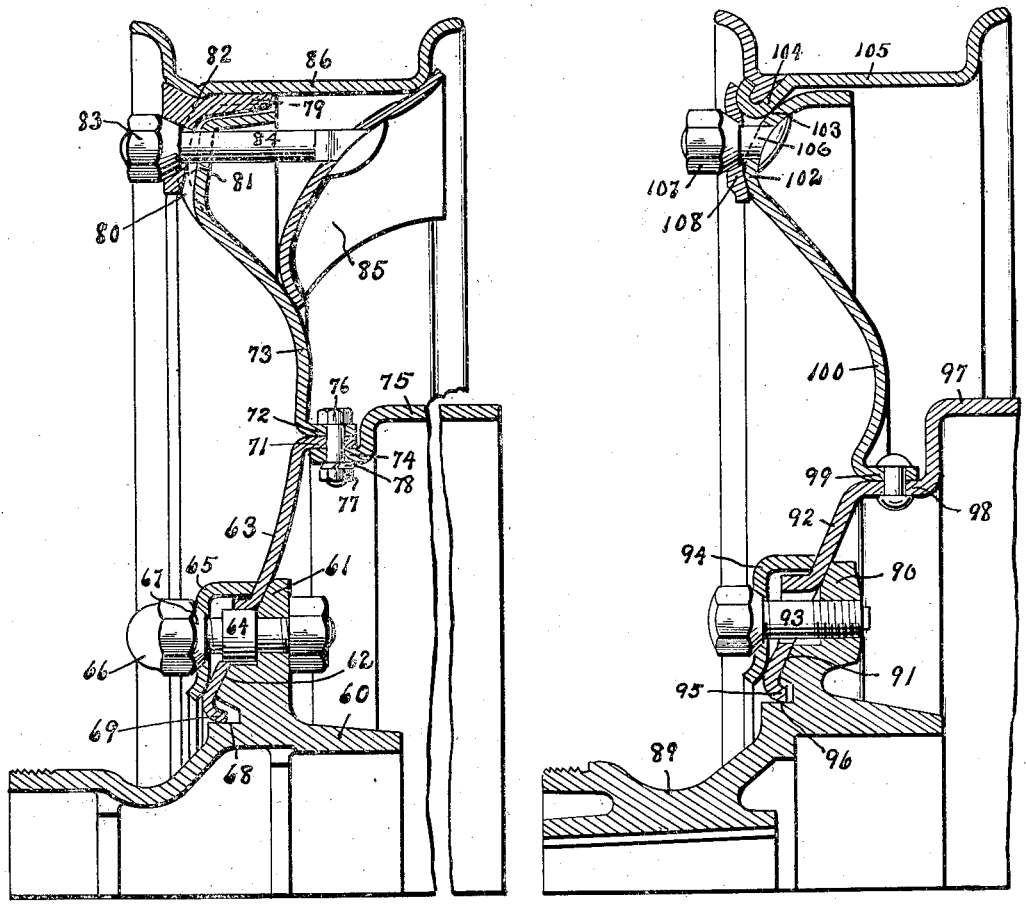

Patented Sept. 29, 1925.

1,555,137

UNITED STATES PATENT OFFICE.

FRANK L. MAIN, OF BIRMINGHAM, AND EMIL R. JACOBI, OF JACKSON, MICHIGAN, ASSIGNORS TO HAYES WHEEL COMPANY, OF JACKSON, MICHIGAN, A CORPORATION OF MICHIGAN.

DISK WHEEL.

Application filed June 4, 1923. Serial No. 643,250.

*To all whom it may concern:*

Be it known that we, FRANK L. MAIN and EMIL R. JACOBI, citizens of the United States, and residents of Birmingham, Oakland County, Michigan, and Jackson, Jackson County, Michigan, respectively, have invented a new and Improved Disk Wheel, of which the following is a specification.

This invention relates to the construction of vehicle wheels of the single disk type, that is, to those wheels wherein the load stresses are transmitted from the tire-carrying rim to the hub by means of a web consisting of a single thickness of sheet metal, and the object of this invention is to provide a wheel of this character wherein the disk is built up of a plurality of concentric rings of which one or all may be formed from a strip or ribbon of sheet metal bent to annular form.

This invention consists, in combination with a hub having a circumferential flange, of a ring fitting and secured to said flange, an outer ring attached to the periphery of the inner ring and concentric therewith and with the hub, and a demountable rim attached to the outer ring.

It also consists in a brake drum attached to the web or disk thus produced at the line of connection between two concentric parts thereof, the brake drum being integral with one of the parts if desired.

It further consists in the details of construction illustrated in the accompanying drawings and particularly pointed out in the claims.

In the drawings, Figs. 1 to 5 inclusive are sections of wheels embodying the present invention taken on planes extending axially of the wheels. Fig. 6 is a similar section showing a slightly different connection between the parts of the disk.

Similar reference characters refer to like parts throughout the several views.

Referring to Fig. 1, the hub 1 is shown provided with a circumferential flange 2 having a conical bearing face 3 and provided with holes to receive studs 4 which are held in position by nuts 5. The flange is formed with a circumferential groove 6 to receive the inner edge 7 of an annulus 8 of sheet metal, this edge 7 bearing on a cylindrical surface 9 of the hub. The annulus is also formed with two cylindrical portions 10 and 11 connected by the radial portion 12, the part 11 constituting a brake drum. A clamping ring 13 and nuts 14 secure this inner portion of the wheel disk to the hub. This clamping ring is preferably channel-shaped with its edges engaging the conical portion of the disk at substantially the outer and inner edges of the conical surface of the flange on the hub.

Surrounding the annulus 8 and concentric therewith is a second annulus 16 having a cylindrical inner edge 17 fitting the part 10 of the inner annulus and secured thereto in any desired manner, rivets 18 being shown. The outer edge 19 of this annulus is also cylindrical and receives a felly 20 having an outer flange 21 and an inner flange 22 through which clamping bolts 23 extend. The outer edge 24 of the flange 22 is curved to receive the demountable rim 25 which may be secured in position by the wedges 26 and nuts 27.

This wheel therefore consists of a hub, a felly and a disk, the disk formed of a plurality of concentric members attached together, and further, they are attached together at the line of attachment of the brake drum. Other figures of the drawings show that this brake drum may be attached to the disk proper in any desired manner.

The hub shown in Fig. 2 is similar to that just described. The inner annulus 30 is set back at 31 to receive the inner edge of the outer annulus 32, and the brake drum 33 attaches as shown. The conical form of the annulus 30 is continued in the outer annulus 32 until tangent to the outwardly concave middle portion thereof, which concave portion emerges into the convex portion 34 which terminates at the radial portion 35, which, in turn, has a curved outer edge 36 that supports the demountable rim 37. A ring 38 may be formed by rolling a strip to proper shape and then bending into a ring, the ends of the strip being welded together. The inner edge 39 of this ring may be attached to the annulus 32. Clamping bolts 40 are supported by the disk and the ring 38 and carry the rim clamps 42 which are held in place by the nuts 43. The upper outer edge of the ring 38 may be notched to receive these clamps. The inner annulus 30 and the brake drum 33 attached thereto of Fig. 2 and the inner annulus 8 of Fig. 1 and the brake drum 11 attached thereto, may be rolled from flat strips and then bent to proper form after which their ends are welded together to constitute the annuli shown. In both the disks of Figs. 1 and 2 the metal at the holes for the studs 4 may be formed into the bearing flanges 44.

The inner annulus 46 in Fig. 3 is formed with an outer flange 47, the brake drum 48 has a flange 49 bearing on the inner side of the flange 47, while the flange 50 at the inner edge of the outer annulus 51 bears on the outer surface of the flange 47. The outer annulus continues the outwardly concave curvature of the disk to nearly the inner edge of the radial periphery 52 which receives the bolts 53. A ring 54 is attached at its inner edge to the disk and receives the demountable rim 37 on its outer edge, which rim may be secured in place by the wedges 42 and nuts 43.

The structure shown in Fig. 6 is similar to that of Fig. 2, but on a larger scale, the difference being in the rivets 56 whose heads 57 are countersunk below the surface of the annulus 32, and in the filling ring 58 welded in place so as to produce a continuous unbroken outer surface for the disk. It is evident that similar filling rings may be employed in the other embodiments shown.

The wheel shown in Fig. 4 is of much heavier construction. The hub 60 has the flange 61 provided with a conical surface 62 to which the annulus 63 is secured by studs 64, clamping ring 65 and nuts 66. In this case the nuts 66 are formed with conical bearing surfaces 67 to fit conical holes in the clamping ring and thus position the ring. The inner edge 69 of the annulus 63 bears on the cylindrical surface 68 of the hub.

The cylindrical outer edge 71 of the annulus 63 extends between the cylindrical inner edge 72 of the outer annulus 73 and the edge 74 of the brake drum 75. These several members may be connected in any desired manner, bolts 76 with nuts 77 and lock washers 78 being shown. The outwardly concave curvature of the part 63 of the disk is continued in the part 73 which curvature is reversed near the periphery of the part 73 which periphery is in the form of a cylindrical felly 79. The outwardly convex portion 80 is shown formed with pockets 81 to receive rim clamps 82 which are mounted on the conical inner ends of the nuts 83 on the bolts 84. These bolts are mounted in holes in the part 80 of the disk and in plates 85 attached to the disk. The demountable rim 86 is secured by means of these rim clamps and plates 85 but has a line contact with the disk just outside of the cylindrical felly 79.

The hub 89 shown in Fig. 5 has the flange 90 with its conical face 91 to which the conical portion of the annulus 92 is secured by means of screws 93 and the clamping ring 94. The inner edge 95 of the annulus 92 again bears on the cylindrical surface 96 of the hub. It will be noticed that the holes for the screws 93 are so large that the entire load stresses are transferred to the hub by means of the conical flange thereof and the edge 95 of the disk. The conical portion of the annulus again merges into a brake drum 97, a cylindrical band 98 being interposed to receive the cylindrical inner edge 99 of the outer annulus 100.

The outwardly concave portion of the disk merges into the outwardly convex portion 102 which contacts along a line 103 with the rib 104 on the Q. D. rim 105 which is held in position by bolts 106, nuts 107 and rim clamps 108. The stresses resulting from tightening these nuts are local and are not transmitted to the disk as radial stresses.

It will be noticed that the dished disks of the several figures extend outwardly from a plane transverse to the axis of the wheel and control of the demountable rim toward the rim and hub respectively and that the brake drum extends inwardly from this same plane.

The inner annulus of each wheel may be standard and the outer annulus of any desired external diameter so that disks of any desired diameters may be produced. A continuous ring such as the ring 54 in Fig. 3 may be substituted for the plates 85 of Fig. 4, pockets to receive the heads of the clamping bolts being provided if desired. Any other desired interchange of the details of construction may be made and the proportions and details of the parts may all be changed by those skilled in the art without departing from the spirit of our invention as set forth in the following claims.

We claim:—

1. A wheel comprising a hub and a rim and a dished disk constituting the connection between the rim and hub, said disk being formed of concentric rings, the inner ring embodying a conical portion and the hub embodying a flange having a conical face, and means to secure the conical portion of the disk to the conical surface of said flange, said hub having an external cylindrical surface to receive the inner edge of said disk.

2. A wheel comprising a hub and a rim and a disk connecting the hub and rim, said hub having a cylindrical bearing surface for the inner edge of the disk and a conical flange adjacent thereto contacting with a conical portion of the disk, said disk comprising two concentric portions, one of which has one edge formed cylindrical to constitute a brake drum.

3. A wheel comprising a hub and a rim and a dished disk constituting the connection between the rim and hub, said disk being formed of concentric rings, the inner ring embodying a conical portion and the hub embodying a flange having a conical face, and means to secure the conical portion of the disk to the conical surface of said flange comprising a clamping ring channel-shaped in cross-section, the edges of the ring engaging the disk along the inner and outer edges of the conical surface of the flange on the hub.

4. A wheel comprising a hub and a rim and a disk constituting the connection between the hub and rim, said disk being formed by concentric annuli having their adjacent edges united, a cylindrical brake drum integral with one of said annuli, and a ring of metal welded to said annuli at their line of contact.

5. A wheel comprising a hub, a demountable rim and a dished disk connecting them, said disk being formed by concentric annuli having their adjacent edges united, the contact between the disk and the hub and rim respectively being outward of the central load plane of the wheel and the line of connection between the annuli being substantially in said plane.

FRANK L. MAIN.
EMIL R. JACOBI.